United States Patent [19]

Ponzano

[11] 4,058,847
[45] Nov. 15, 1977

[54] MAGNETIC INFORMATION CARRIER HAVING BOTH ENDS FREE AND APPARATUS FOR WRITING ON AND/OR READING IT

[75] Inventor: Gian Luigi Ponzano, Ivrea (Turin), Italy

[73] Assignee: Ing. C. Olivetti & C., S.p.A., Ivrea (Turin), Italy

[21] Appl. No.: 627,260

[22] Filed: Oct. 30, 1975

[30] Foreign Application Priority Data

Nov. 7, 1974 Italy ................................ 70271/74
Aug. 21, 1975 Italy ................................ 69113/75

[51] Int. Cl.$^2$ .................... G11B 5/78; G11B 23/08; G11B 25/06
[52] U.S. Cl. .................................... 360/132; 360/93
[58] Field of Search .............. 360/132, 131, 134, 83, 360/90, 130, 93, 96; 242/55.16

[56] References Cited

U.S. PATENT DOCUMENTS

| 2,475,694 | 7/1949 | Camras ................................ 360/131 |
| 2,892,899 | 6/1959 | Connell ............................... 360/132 |
| 3,285,612 | 11/1966 | Hallamore ........................... 360/137 |
| 3,682,415 | 8/1972 | Ibuchi ................................. 360/132 |
| 3,831,199 | 8/1974 | Vollum et al. ...................... 360/134 |

FOREIGN PATENT DOCUMENTS 646,373 4/1964 Belgium .............................. 360/93

Primary Examiner—Alfred H. Eddleman
Attorney, Agent, or Firm—Schuyler, Birch, Swindler, McKie & Beckett

[57] ABSTRACT

A magnetic information carrier comprises a support or base strip made, for example, of plastic material or of light metal, on which a layer of magnetizable material is deposited.

The support is pretensioned so as to assume at rest a stable configuration following a spiral path, without the auxiliary of a central core. This carrier is written on and/or read by an apparatus comprising a first cavity on which the carrier is placed. The carrier is fed by a capstan in front of a magnetic head and is pushed into a second cavity of the apparatus, wherein the carrier winds itself following a spiral configuration similar to the initial one. In a second embodiment, the carrier is mounted in a removable cartridge having one or two cavities.

11 Claims, 5 Drawing Figures

MAGNETIC INFORMATION CARRIER HAVING BOTH ENDS FREE AND APPARATUS FOR WRITING ON AND/OR READING IT

BACKGROUND OF THE INVENTION

1. Field of Invention

The present invention relates to a magnetic information carrier comprising a substrate or base strip and a layer of magnetizable deposited on the substrate.

2. Description of the Prior Art

Known magnetic carriers of this type are produced principally in the form of tapes, cards and strips. The invention further relates to apparatus for writing on and/or reading from the information carrier and to cartridges for the information carrier.

In magnetic tapes the substrate is generally constituted by a very thin strip of plastic material (having a thickness of a few hundredths of a millimeter) and on one face of which there is deposited a magnetizable coating or layer of iron oxide and other magnetizable substances. These tapes are normally very long and for storage they are wound in concentric turns around a rigid take-up core or are packed in random fashion in suitable containers or cartridges. These tapes, by very reason of the small dimensions of their cross-section, are very flexible and are fed solely by being drawn along in front of the writing and/or reading transducer. In the case where the tape must be fed in both directions, the feed elements are therefore disposed in pairs at the sides of the transducer(s), thus rendering the writing and/or reading apparatus complex and costly.

In magnetic cards and strips, on the other hand, the base layer is stiff and its thickness is a few tenths of a millimeter. These cards or strips are normally flat and, because of their stiffness and owing to the need for them to be easily handled, have rather restricted length. Therefore, these latter magnetic carriers, although they can be fed both by pulling and by pushing and thus by using very simple apparatus, do not permit a high level of data storage otherwise than by increasing the number of recording tracks, to the detrimental increase, however, of the breadth of the carrier.

SUMMARY OF THE INVENTION

The object of the present invention is to provide a magnetic carrier sufficiently long for storing a large number of items of information, which is sufficiently stiff to be fed both by pushing and by pulling and which has a limited bulk.

The invention further provides cartridges for the magnetic carrier and apparatus for writing on and/or reading from the carrier, as hereinafter described and claimed.

BRIEF DESCRIPTION OF THE DRAWINGS

The invention will be described in more detail, by way of example, with reference to the accompanying drawings, in which.

DESCRIPTION OF PREFERRED AMBODIMENTS OF THE INVENTION

Figure 2:
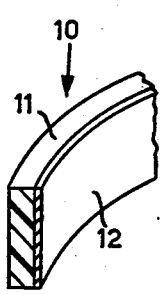
FIG. 2 is a perspective view, partly in section, of a segment of the magnetic carrier of FIG. 1.

Referring to FIG. 2, the magnetic carrier comprises a tape 10 constituted by a substrate or base strip 11 made, for example, of polyethylene terephthalate known commercially as Mylar (Registered Trade Mark) which has a pronounced tendency to curl and bend. On one face of the strip 11 there is deposited a coating 12 of magnetizable material, for example iron oxide. The tape 10 has a length of about 4 meters and, with normal packing of data, can store about 16,000 characters for each recording track.

Figure 1:
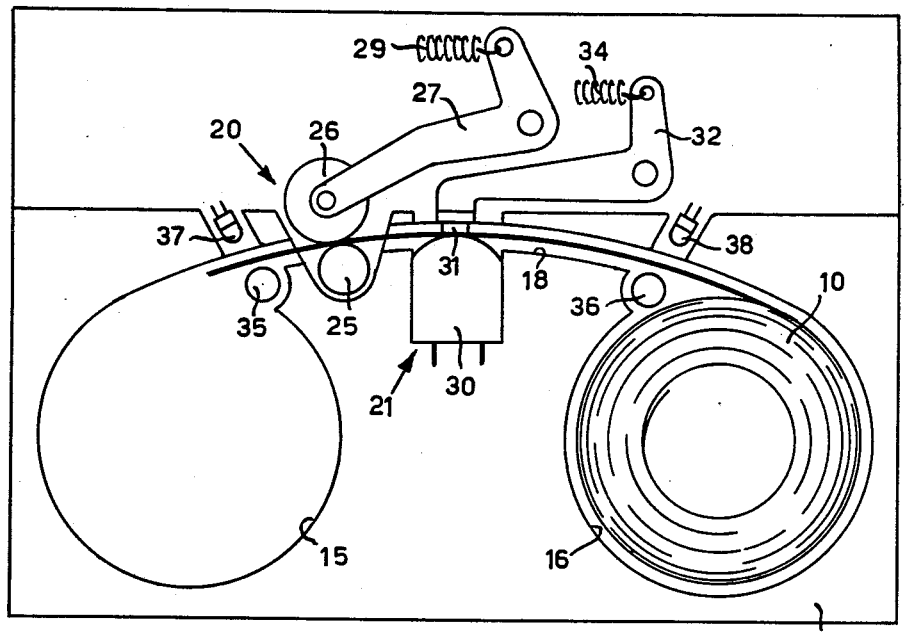
FIG. 1 is a plan view of a magnetic carrier and an apparatus for writing on and/or reading it, embodying the invention.

The strip 11 has a thickness of about two tenths of a millimeter. During its manufacture the strip is preformed so as to assume at rest a stable configuration following a spiral path (FIG. 1.) This can be achieved, for example, by keeping the strip tightly wound around a forming core and then heating it to 80° to 100° C so as to deform it permanently under the action of the forces which are keeping the strip coiled. The strip having been restored to normal temperature and the forming core having been withdrawn, the strip permanently retains the desired spiral configuration.

The base strip 11 may alternatively be of metal, for example alumium, and in this case the strip is cold-preformed instead of hot-preformed.

The apparatus for writing on and/or reading the magnetic carrier hereinafter described comprises a base 13 made of light metal, such as for example aluminum, in which there are formed two substantially circular cavities 15 and 16 within the magnetic carrier 10 wound in a spiral is housed.

Formed in the base 13 between the cavities 15 and 16 is a groove 18 which defines a slightly curved path for the carrier 10. Along this path, the feed elements 20 and the writing and/or reading transducer 21 are arranged in suitable seats formed in the base 13. The feed elements 20 comprise a driving capstan 25, which is connected in any known manner to an electric motor not shown in the drawings, and a pressure roller 26 mounted rotatably at the end of a lever 27. A spring 29 holds the pressure roller 26 normally in contact with the capstan 25.

The writing and/or reading transducer 21 comprise a magnetic head 30 and an opposing pressure pad 31, for example a felt pad supported at the end of a lever 32 and urged against the head 30 by a spring 34. Although only a single transducer is shown, more than one transducer, including an erase head for example may be provided.

At the ends of the groove 18, adjacent the cavities 15 and 16, there are arranged two metal studs 35 and 36, respectively, inside which there are disposed photosensitive elements of known type which co-operate with two lamps 37 and 38 to detect the passage of synchronizing holes formed in the proximity of the ends of the magnetic carrier 10.

The apparatus and the magnetic carrier operate in the following manner. The magnetic carrier 10 performed in a spiral is inserted in the cavity 16 and its initial portion is seated in the groove 18 in such manner as to interpose it between the head 30 and the opposing element 31 and between the capstan 25 and the pressure roller 26.

Once the tape 10 has been so positioned, the capstan 25 is started up in any known manner, thus feeding the carrier 10 in front of the head 30 by a pulling action. Owing to the absence of any extra mass (like a spool), the magnetic carrier 10 has a low inertia and, consequently, the times for its acceleration and deceleration are very short. The carrier 10, entering the cavity 15, maintains a curved configuration because of its internal stresses, assuming, being wound upon itself, the arrangement of a spiral. The carrier is fed by pushing into the cavity 15, this being possible because of its stiffness and curve set in the strip. When the photosensitive element arranged inside the stud 36 detects the passage of the hole formed in the terminal portion of the carrier 10, the rotation of the capstan 24 is arrested.

At this point, by reversing the rotation of the driving capstan 25 in known manner, the carrier 10 returns into the cavity 16 by being pulled from the cavity 15 and pushed in front of the head 30 and into the cavity 16.

Figure 3:
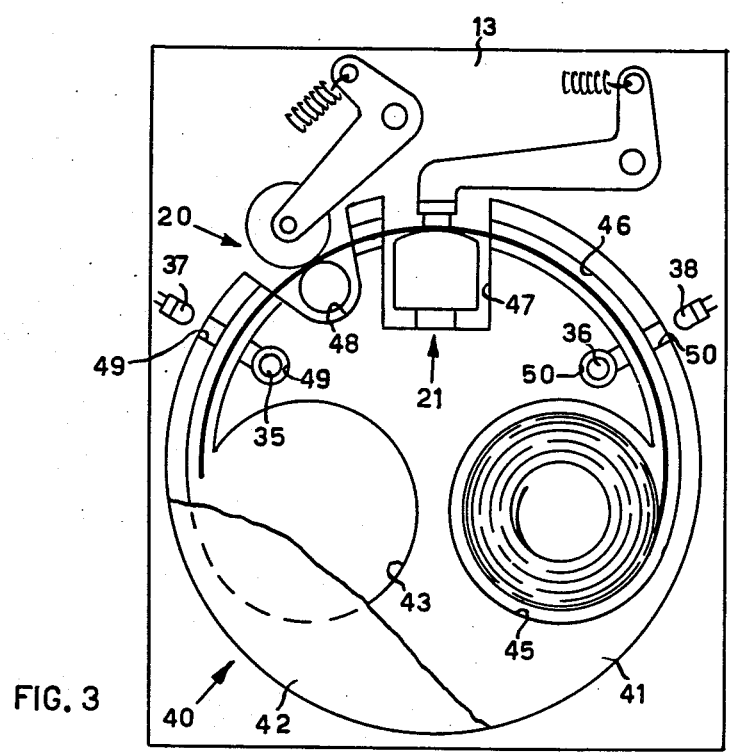
FIG. 3 is a plan view of a first cartridge for the magnetic carrier as shown in FIG. 1.

The magnetic carrier 10 may also be contained in a cartridge 40 (FIG. 3), made, for example, of plastics material.

According to a first embodiment, a cartridge 40 (FIG. 3) is of substantially circular form and comprises a container 41 and a cover 42. The container 41 is shaped so as to form two circular cavities 43 and 45 in which the carrier 10 wound in a spiral is housed.

A peripheral groove 46 is also formed in the container 41 and places the cavity 43 in communication with the cavity 45. Suitable openings 47, 48, 49 and 50 are formed in the container 41 in correspondence with the groove 46 to enable the writing and/or reading transducer 21 and the feed elements 20 and synchronizing elements 35, 36, 37 and 38, respectively, to engage the magnetic carrier 10.

In the case in which the carrier 10 is contained in a cartridge 40, locating means of known type, not shown in the drawings, are provided on the above-described writing and/or reading apparatus for positioning the cartridge 40 correctly with respect to the writing transducer 21 and the feed elememnts 20.

In the case of the use of the cartridge 40, the operation of the apparatus is similar to that previously described for the tape 10 only and, for brevity, is therefore not further described.

Figures 4, 5:
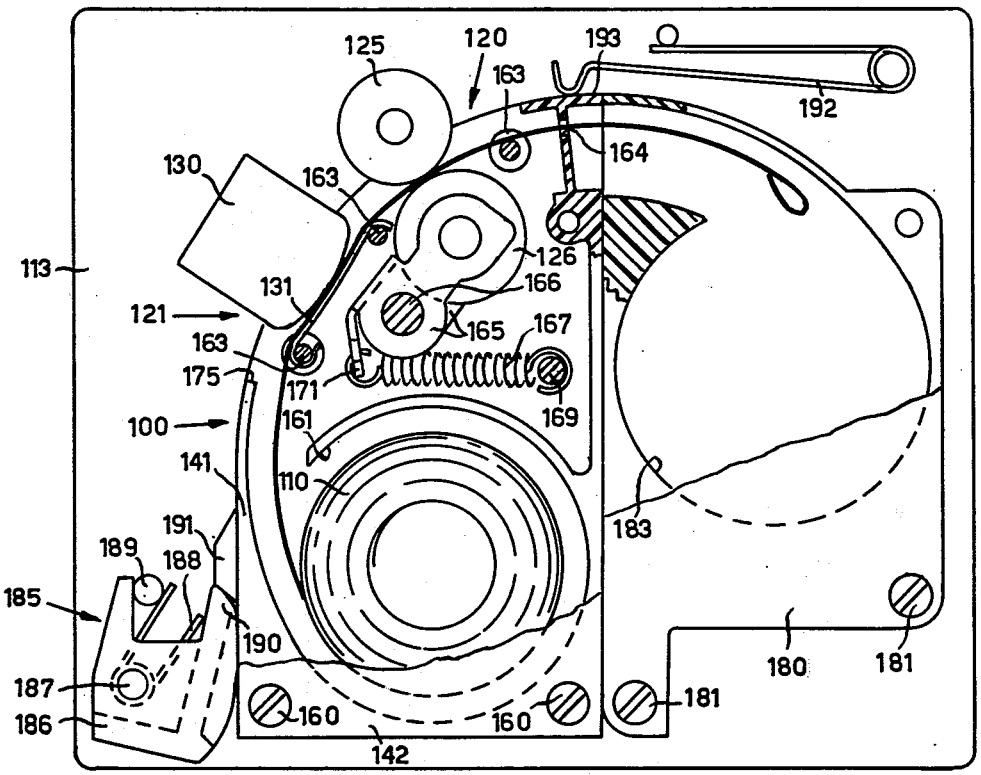
FIG. 4 is a plan view, partly in section, of a second cartridge for the magnetic carrier.
FIG. 5 is a plan view, partly in section, of a third cartridge for the magnetic carrier.

According to a second embodiment, a magnetic tape 110 (FIG. 4) of the above-described type is contained in a cartridge 100, which comprises a container 141 of plastics material and a closing cover 142, which is also of plastics material or of light metal such as, for example, aluminum. The cover 142 is fixed removably to the container 141 by means of screws 160. The container 141 is shaped so as to define a single substantially cylindrical cavity 161 inside which the preformed tape 110 is arranged.

Guide means constituted by metal rollers 163 are mounted in the container 141 and guide the tape 110 from the cavity 161 outside the container 141 and through an opening 164. One end of the tape 110 is bent back on itself to prevent the initial portion of the tape from disappearing into the cavity 161 in the container 141 through the opening 164.

Inside the cntainer 141 there is arranged a pressure roller 126 which is disposed close to the path defined by the guides 163 and is mounted rotatably between two levers 165 parallel to one another and pivoted on a pin 166 carried by the container 141. A spring 167 stretched between a stud 169 of the container 141 and a lug 171 of the lever 165 keeps the pressure roller 126 constantly urged against the inner unmagnetized surface of the tape 110. Between two of the guide rollers 163 there is arranged a flexible metal strip 131 on which the inner surface of the tape 110 bears.

A lateral opening 175 is formed in the container 141 to enable a magnetic head 130 and a feed element 120 of the writing and/or reading apparatus 121 to contact the tape 110 at the strip 131 and the roller 126, respectively, to write on and/or read and feed the tape 110. The apparatus for writing on and/or reading the tape 110 comprises a base 113 on which a container 180 is fixed by means of screws 181. Inside the container 180, there is formed a cavity 183 within which the tape 110 is temporarily accommodated during the stages of writing and/or reading. On the base 113 there are also mounted the magnetic head 130 and the feed element 120. The latter comprises a driving capstan 125 which is connected to a motor, not shown in the drawings, and is rotatable on the said base 113.

A locking element 185 comprising a U-shaped block 186 is pivoted on a pin 187 on the base 113 and is kept turned clockwise by a hairpin spring 188 compressed between a stud 189 and an arm 190 of the block 186. The arm 190 is adapted to co-operate with a tooth or projection 191 of the tape cartridge 100. A spring 192 is arranged on the base 113 and is adapted to co-operate with an upper edge 193 of the tape cartridge 100.

To record on the magnetic tape 110 contained in the above-described cartridge 100, operation is performed in the following manner. In the inoperative state, the tape 110 is stored in the cavity 161 with its initial portion disposed along the path defined by the rollers 163 and with the bent end close to the opening 164.

The cartridge 100 is inserted in the writing and/or reading apparatus 121 between the fixed container 180 and the locking element 185 in such manner that its lower edge is resting on the base 113. By pushing the cartridge 110 upwards, in opposition to the action of the spring 192, the tooth 191 is caused to overcome the locking element 185, which returns to the rest position, locking and locating the cartridge with respect to the head 130 and to the driving capstan 125, which in turn are brought into contact with the magnetic tape 110.

The capstan 125 is then set in rotation and, co-operating with the pressure roller 126, causes the tape 110 to advance, transferring it from the cavity 161 of the cartridge to the cavity 183 of the container 180. When writing and/or reading is finished, the tape 110 is transferred again to the cartridge 100 by withdrawing it from the cavity 183 to the cavity 161 by rotating the capstan 125 in the opposite direction.

Suitable means of detecting the passage of the tape may be provided on the writing and/or reading apparatus for identifying when the unwinding of the tape is about to come to an end and for arresting the rotation of the capstan 125 before the terminal portion of the tape moves beyond the path defined by the guide rollers 163.

Once the tape 110 has been rewound into the cartridge 100, this is easily withdrawn from the apparatus 121 by causing the block 186 to turn anticlockwise in opposition to the action of the spring 188. Since the cartridge 100 then lacks the arresting action of the arm 190, it is pushed downwards under the action of the spring 192.

According to a third embodiment, the magnetic tape 210 is contained in a cartridge 200 (FIG. 5) comprising a container 241 and a closing cover 242. The container 241 is of substantially parallelepipedal form and is shaped internally so as to define two cylindrical cavities 243 and 245 adapted to receive a magnetic tape 210 wound in the form of a spiral. Between the two cavities, in a space 246 there are arranged a pressure roller 226 and an opposing element 231 which are adapted to co-operate with a driving capstan 225 and a magnetic writing and/or reading head 230, respectively, the driving roller and the magnetic head being mounted on a base 213 of the writing and/or reading apparatus.

Writing on and/or reading the tape 210 takes place in a manner substantially similar to that already described in the case of the tape 110 contained in the cartridge 100 and, for brevity, is therefore not further described.

What I claim is:

1. A cassette containing a magnetic information strip of the type comprising a base of flexible material pretensioned so as to assume when at rest a stable configuration following a spiral path and a coating layer of magnetizable material coating a surface of said strip, wherein said strip has two free ends, said cassette comprising a container, means defining in said container a cavity wherein said strip is placed and an aperture, guide means for guiding said strip out of said container through said aperture, a feed mechanism mounted on said container along said guide means and means for preventing the passage of both ends of said strip through said guide means.

2. A cassette according to claim 1, wherein said feed mechanism comprises a pinch roller rotatably mounted on said container and elastic means for holding said pinch roller constantly at contact with said carrier.

3. A cassette according to claim 1, wherein said preventing means comprises an arrest member at one of said two ends, said arrest member being larger than said aperture whereby avoiding the entering of said arrest member into said aperture.

4. A cassette according to claim 3, wherein said arrest member comprises a fold of said carrier located at one of said two ends thereof.

5. A cassette according to claim 1, wherein said preventing means comprises detecting means disposed at an extremity of said guide means for detecting the passage of the ends of said carrier and means coactive with said detecting means for arresting said feed mechanism.

6. A magnetic information strip for a recording system for use in a small calculating, accounting unit and similar office machines, wherein said system comprises a recording station and means for advancing said strip through said station from a first side to a second side thereof, said strip comprising a base of flexible material so preformed as to assume when at rest a stable configuration following a spiral path, and a coating layer of magnetizable material coating a surface of said base, said strip having both ends free, so that said strip can be substantially completely unwound under the action of said advancing means for completely passing from said first side to said second side through said recording station.

7. A magnetic information strip for a recording system for use in a small calculating, accounting unit and similar office machine, wherein said system comprises a recording station and means for advancing said strip through said station from a first side to a second side thereof, said strip comprising a base of flexible material and a coating layer of magnetizable material disposed on said base, said base having both ends free and being preformed following a predetermined substantially constant curvature, said strip having the characteristic of assuming, when at rest, a spiral configuration following said curvature at said first side and being able to assume again substantially said configuration after its passing through said station at said second side, whereby a minimum and substantially constant force is sufficient to said advancing means for the advancing of said strip.

8. A recording system for recording a magnetic information strip comprising a recording station for serially recording said magnetic strip; means for advancing said strip through said recording station from a first side to a second side thereof, and wherein said strip comprises a base of flexible material so preformed as to assume when at rest a stable configuration following a spiral path and a coating layer of magnetizable material coating a surface of said strip, wherein the improvement is that said strip has both ends free at said first and said second side so as to be substantially completely unwound under the action of said advancing means for passing through said recording station from said first to said second side thereof and said strip has the further characteristic of freely and completely rewinding itself following said configuration after being passed through said station.

9. A recording system according to claim 8, further comprising means for detecting the passage of said ends through said recording station and means connected to said detecting means for controlling said advancing means to prevent the passage of both ends of said strip through said station.

10. A recording system according to claim 8, further comprising a frame, a first cavity on said frame at said first side for storing said strip when at rest, a second cavity on said frame at said second side for receiving said strip after its recording and a guide groove formed in said frame and placing said two cavities in communication therebetween for guiding said strip from said first to said second cavity, said recording station and said advancing means being disposed along said guide groove.

11. A cassette for a magnetic information strip of the type comprising a base of flexible material pretensioned so as to assume when at rest a stable configuration following a spiral path and a coating layer of magnetizable material coating a surface of said strip, said cassette comprising a container, a first cavity on said container wherein said strip is stored and a second cavity on said container for storing said strip after its recording and/or reading, guide means for guiding said strip from one to another of said two cavities and means defining at least an aperture in correspondence of said guide means to permit said strip to be contacted by feeding means and by recording and/or reading means, said strip having both ends free in said cavities, so that the entire strip can pass from one to another of said cavities under the action of the feeding means.

* * * * *